FIG. I

April 25, 1961 R. W. LILLIGREN 2,981,061
GYROSCOPIC STABILIZER FOR ROCKET
Filed July 3, 1959 2 Sheets-Sheet 2

INVENTOR.
Robert W. Lilligren

United States Patent Office 2,981,061
Patented Apr. 25, 1961

2,981,061

GYROSCOPIC STABILIZER FOR ROCKET

Robert W. Lilligren, 111 Eucalyptus Drive,
El Segundo, Calif.

Filed July 3, 1959, Ser. No. 824,820

5 Claims. (Cl. 60—35.55)

This invention relates to new and useful improvements in rocket-stabilizing means. Rockets and missiles are stabilized so that they may maintain their original heading from the launch to target, the stabilizing means counteracting any forces which tend to cause deviation from the heading. Fin-stabilized rockets depend upon the interaction of the aerodynamic pressure or relative wind with the surfaces of the fins. The present invention offers several distinct and unique improvements over existing means of stabilization:

First, one source of inter-rocket interference, which occurs when rockets are fired in salvo from clusters, is eliminated; namely, protruding or unfolding fins.

Second, a means of actually guiding the rocket along a predetermined course is simultaneously achieved. It is well known that rockets fired in salvo are deflected from their intended heading by blast interference. My invention offers a means of correcting for any deviation from a preset course caused by such interference.

An additional important object of my invention is achieved in its unique indifference to its operating altitude. Fin-stabilized rockets derive their stabilizing force from their angle of attack, created by deviation of the axis of the rocket from the direction of the relative wind, and thus are subject to the decreased mass density of air consequent to increased altitude, and relative loss of stability therein. The present invention derives its correcting moment from the controlled variation of thrust around an annular nozzle, said thrust being furnished by effluent gases created by the combustion of the rocket fuel itself.

Other and distinct objects of my invention will become apparent from the description which follows.

In brief and general terms, the invention is practiced by means of a blast-driven contoured rotor, revolved by gaseous dynamic pressure against small turbine vanes on its aft periphery. The forward periphery of the rotor is surrounded by a thrust shield which is so contoured that it maintains constant clearance with the rotor. The thrust shield is stationary relative to the rotor, and is contained within an orifice in such a manner that the peripheral surfaces of the thrust shield and the surrounding wall of said orifice form a variable-geometry annular orifice. The thrust shield is supported on an internally-gimballed yoke, which supports a rotary bearing, which in turn supports the rotor, permitting rotation of the rotor with respect to the longitudinal axis of the orifice and angular motion of the rocket about the congruent lateral axes of the rotor and the thrust shield. The thrust shield has such geometry that, as the rocket deviates from the direction of the longitudinal axis of the rotor, the centroid of the nozzle area moves in the direction of such deviation, consequently moving the resultant thrust in the same direction and causing a righting moment which tends to realign the rocket with the rotational axis of the rotor. The rotor is caged by means of a bearing ball retained partly in an axial detent in the periphery of the end of the rotor shaft and partly in a mating notch formed by two radial spring-loaded pins, so that when the rocket is fired and the rotor attains its rotational velocity, said spring-loaded pins are forced outwardly by centrifugal force, dilating the mating notch which previously retained the caging ball, and allowing the ball to move aft out of the detent on the end of the rotor shaft, due to the forward acceleration of the rocket, and into a recess provided in the rear axial portion of the rotor, said rotor then capable of gyroscopically tilting and thereby operating to correct alignment of the rocket with the intended heading as discussed, supra.

The accompanying drawings illustrate only present preferred forms of the invention and relative assemblies thereof and are not meant to define the scope and limits of the invention, that purpose being accomplished by the appended claims.

Figure 1:
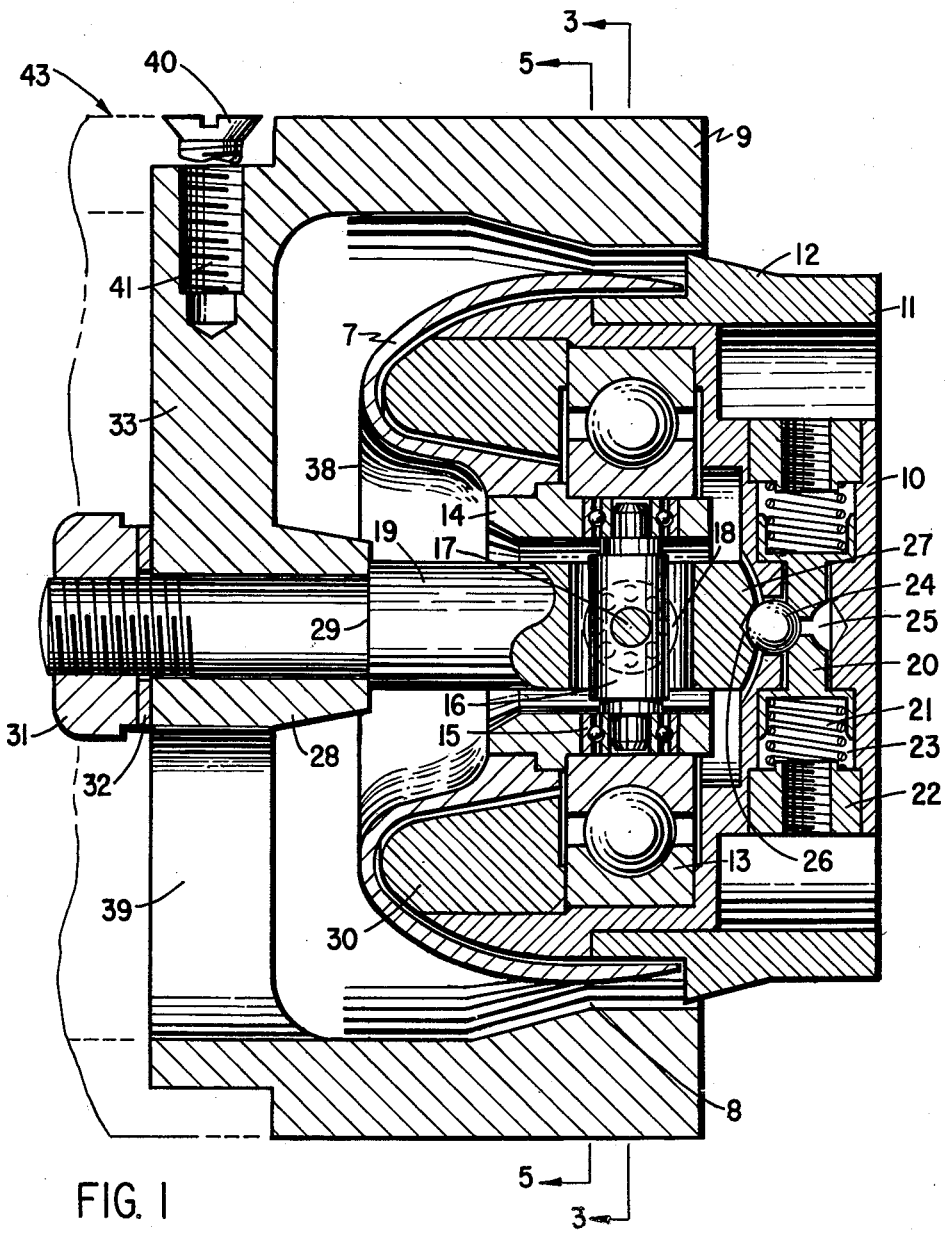
Fig. 1 is a longitudinal axial section through the presently preferred form of the entire device in the caged-rotor condition and attached to the rocket proper.

Referring now merely to the specific parts of the preferred form of the invention illustrated in the drawings, it is seen from Fig. 1 that the device consists essentially of a contoured rotor 10 having an impeller ring 11, integral with which is a multiplicity of turbine vanes 12, circumferentially spaced along the periphery of said impeller ring 11 and inclined in relation to the axis thereof. A thrust shield 7 covers the forward portion of rotor 10 in such a manner that a constant clearance is at all times maintained between those two members. Thrust shield 7 provides on rotor 10 an external wall which is radially spaced from the internal wall of a housing 9 to define an annular passage terminating in an exhaust orifice 8 which is normally of uniform radial width around its circumference. Rotor 10 and housing 9 together constitute an annular exhaust nozzle for a rocket 43. Radially disposed in the aft portion of rotor 10 are two caging pins 20, which are slidable within their respective chambers 23 and against which bear caging pin springs 21, exerting a predetermined force against said pins 20, tending to restrain the radially outward movements of those members. The opposite ends of the respective springs 21 are constrained by plugs 22, which are rigidly confined within the entry portions of respective chambers 23. A caging ball 24 partially and movably resides within caging ball receptacle 25, into which radially extend the contoured inner ends of caging pins 20, said ends preventing the aft movement of caging ball 24. Diametrally opposite that portion of the periphery of ball 24 which is constrained by caging pins 20 is a detent 26 in the spherical end of pivot yoke 27, in which ball 24 likewise resides and which prevents forward travel of said ball 24. Disposed within the hollow interior of rotor 10 is a rotary bearing 13, the outer race of which rotates with rotor 10 and the inner race of which remains stationary relative thereto. Pressed into the bore of said inner race of bearing 13 is the gimbal yoke portion 14 of thrust shield 7, said gimbal yoke 14 and thrust shield 7 being integrally and contiguously related. Between the poles of gimbal yoke 14 is mounted gimbal shaft 16 upon gimbal bearings 15, said shaft 16 being located in the plane of the center of gravity of the entire rotor assembly 38. Extending rigidly and diametrally through the center of gimbal shaft 16 is stud shaft 17, the ends of which revolve within stud shaft bearings 18, which in turn are assembled within pivot yoke 27. Said pivot yoke 27 is provided with a clearance through which gimbal shaft 16 extends in such position that there may be a predetermined free angular movement of the axis of said shaft 16 within pivot yoke 27 and relative thereto. Integral with pivot yoke 27, shaft 19 extends forward through a dished forward end 38 of rotor 10 and through a supporting hub 28 of housing 9 and is attached to said housing 9 by means of a nut 31 and washer 32. Shaft 19 positions the rotor 10 axially by means of a shoulder 29, located on shaft 19 at a predetermined longitudinal position. A retainer 30 is pressed within rotor 10 forward of bearing 13 to prevent relative longitudinal movement of rotor 10 and shaft 19. At the forward end of housing 9 is a radial spider 33, providing openings 39 through which effluent gases of rocket combustion are ejected from the rocket into the nozzle 9, 10 and are exhausted through the orifice 8. Rotary bearing 13 and gimbal unit 14—17 cooperatively provide a universally pivotal and rotatable bearing means carried by the housing 9 and supporting the rotor 10 for gyroscopic rotation on a gyroscopic axis which is normally coincident with the major longitudinal axis of rocket 43 (the axis of shaft 19) with the orifice 8 of uniform radial width around its circumference as stated above. The external wall of shield 7 is so contoured with reference to the axis of universal pivotal movement as to vary the orifice 8 in response to angular deviation of the rocket axis (tilting of shaft 19 and housing 9) with reference to the gyroscopic axis of rotation of rotor 10, which remains fixed in space through gyroscopic restraining force. The variation of orifice 8 is such as to enlarge it on the side toward which the forward end of shaft 19 (and the nose of the rocket) have deviated and to restrict it on the opposite side. As the result of this variation of the orifice, thrust of the exhausting gases is augmented on the side toward which the rocket nose has deviated, and the augmented thrust steers the rocket back to its correct path, coincident with the gyroscopic axis.

Figure 2:
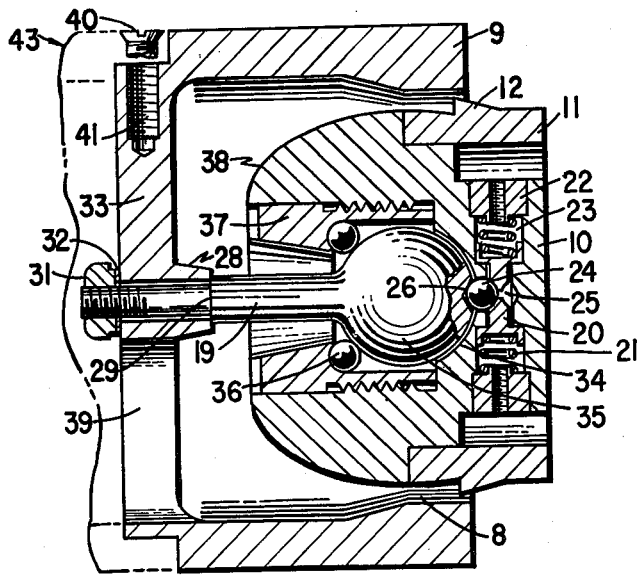
Fig. 2 is a longitudinal axial section at a reduced scale, showing an alternate form of the device in which balls rolling upon a larger sphere replace the gimballed bearing arrangement of the preferred form.
Figure 3:
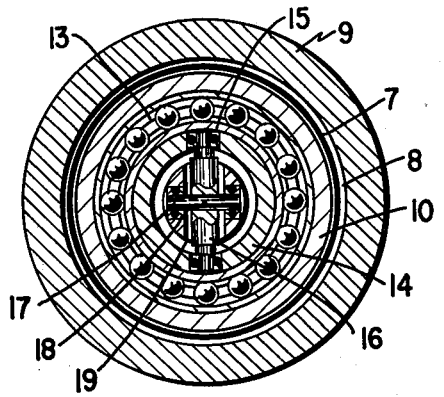
Fig. 3 is vertical lateral section taken along the line 3—3 of Fig. 1, showing a median plane through the gimballing portion of the device.
Figure 4:
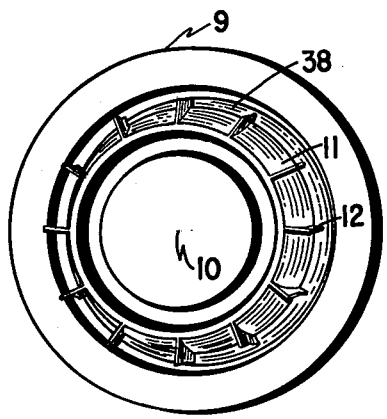
Fig. 4 is a view of the aft end of the preferred form of the device shown in Fig. 1, after the rotor has uncaged and the rocket has deviated from its original heading, altering the nozzle configuration.
Figure 5:
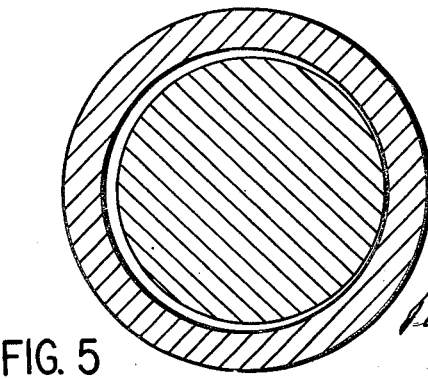
Fig. 5 is a schematic representation of the nozzle configuration at the rotor position depicted in Fig. 4, and is presumed taken along the line 5—5 of Fig. 1.

The alternate form of the device shown in Fig. 2 is substantially identical in operation with the preferred form shown in Fig. 1. However, the gimballing portions of the preferred form have been replaced in entirety by a spherical chamber 34 within the aft portion of rotor 10, a mating enlarged sphere 35 on the aft end of shaft 19, an inner raceway plug 37 threaded into the portion of rotor 10 forward of spherical chamber 34, said plug 37 being provided with a cylindrical cavity mating the chamber 34, and a plurality of bearing balls 36 residing within the constant peripheral clearance between enlarged sphere 35 and the interior of raceway plug 37, said sphere 35 and plug 37, with balls 36, forming a spherical bearing of the well known type, and providing essentially the same degree of gyroscopic freedom as the preferred form shown in Fig. 1. Both embodiments of the invention may be assembled to the rocket proper 43 by means of attaching screws 40 extending into tapped holes 41.

In operation, the device is assembled adjacently and concentrically with the aft end of a rocket 43 or the like, which is then ignited in the usual manner. The effluent gases of combustion thereof impinge upon the radial vanes 12, imparting a rotational velocity about a longitudinal axis to rotor 10, said rotational velocity in turn causing caging pins 20 to move radially outward against the urging of caging pin springs 21, thus opening the seat formed by the opposite ends of said pins 20 and allowing caging ball 24 to move aft out of the detent 26 in the end of pivot yoke 27, under the urging of the contemporaneous forward acceleration of the rocket, into the extreme aft portion of caging ball receptacle 25, thereby uncaging rotor 10. In this condition, assuming that some external force deflects the rocket so that its longitudinal axis assumes an angle relative to the axis of the rotor assembly 38, which has not moved angularly, the said rotor assembly 38 will occupy a relatively changed position within the orifice 8, causing a proportionate relative change in the position of the centroid of the area of the annular nozzle orifice 8 bounded by the external wall of thrust shield 7 and the internal wall of housing 9 at the rear end thereof which is of reduced diameter; the resultant thrust operating to propel the rocket consequently moves in the same direction and thus creates a moment tending to realign the rocket with the longitudinal axis of rotation of the rotor 10. Such realignment or righting cycles are dynamically sequential in respect to time and algebraically computative in respect to gyroscopic mechanics, and those forces which tend to precess the rotor have been minimized.

Since equivalent embodiments of the craft employed in my invention may conceivably be made, it is my desire to anticipate all such modifications and to cover them in the appended claims.

I claim:

1. In a gyroscopic stabilizer for rockets and the like, in combination: an annular housing constituting the exhaust end of a rocket and having an internal wall coaxial with the major longitudinal axis of said rocket; a gyroscopic rotor disposed at least partially within said housing with its external wall spaced radially inwardly from said internal wall to constitute therewith an annular nozzle for exhaust of propellant gas from the rocket, an annular exhaust orifice being defined between the periphery of said rotor and said internal wall at the rear end of said nozzle, said rotor having on its periphery a multiplicity of turbine vanes responsive to the flow of gas through said nozzle to effect gyroscopic rotation of said rotor; and universally pivotal and rotatable bearing means carried by said housing and supporting said rotor for such gyroscopic rotation on a gyroscopic axis normally coincident with said rocket axis, said housing mounting said bearing means for universally pivotal movement about a center located on said axis, said rotor having an external wall so contoured as to vary said orifice in response to angular deviation of said rocket axis from said gyroscopic axis, by enlarging said orifice on the side toward which the nose end of the rocket has deviated, whereby to enlarge the exhaust and consequently augment the thrust at that side with a resultant turning movement correcting the deviation.

2. In a gyroscopic stabilizer for rockets and the like, in combination: a generally cylindrical housing constituting the exhaust end of a rocket and having an internal wall coaxial with the major longitudinal axis thereof, said internal wall terminating at its rear end in an orifice wall of reduced diameter; a gyroscopic rotor disposed at least partially within said housing with its periphery spaced radially inwardly from said orifice wall to define therewith an annular orifice for exhaust of propellant gas from the rocket, said rotor having on said periphery a multiplicity of turbine blades responsive to the flow of gas through said orifice to effect gyroscopic rotation of said rotor; universally pivotal and rotatable bearing means carried by said housing and supporting said rotor for such gyroscopic rotation on a gyroscopic axis normally coincident with said rocket axis, said housing mounting said bearing means for universally pivotal movement about a center located on said axis, said rotor having an external wall so contoured as to vary said orifice in response to angular deviation of said rocket axis from said gyroscopic axis, by enlarging said orifice on the side toward which the nose end of the rocket has deviated, whereby to enlarge the exhaust and consequently augment the thrust at that side with a resultant turning movement correcting the deviation.

3. In a gyroscopic stabilizer for rockets and the like, in combination: a tubular housing constituting the exhaust end of a rocket and having an internal wall coaxial with the major longitudinal axis thereof; a gyroscopic rotor disposed at least partially within said housing with its periphery spaced radially inwardly from the rear end portion of said internal wall to define therewith an annular orifice for exhaust of propellant gas from the rocket, said rotor having on its periphery a multiplicity of turbine blades responsive to the flow of gas through said orifice to effect gyroscopic rotation of said rotor; a universally pivotal bearing means carried by said housing; an anti-friction bearing carried by said bearing means and supporting said rotor for such gyroscopic rotation on a gyroscopic axis normally coincident with said rocket axis, said housing mounting said bearing means for universally pivotal movement about a center located on said axis, said rotor having an external wall so contoured as to vary said orifice in response to angular deviation of said rocket axis from said gyroscopic axis, by enlarging said orifice on the side toward which the nose end of the rocket has deviated, whereby to enlarge the exhaust and consequently augment the thrust at that side with a resultant turning movement correcting the deviation; and centrifugal force responsive retainer means yieldingly restraining said rotor against said universally pivotal movement during rotation of the rotor below a selected release speed of rotation, and releasing said rotor for such pivotal movement when the rotor attains said release speed in its rotation.

4. A gyroscopic stabilizer for rockets and the like comprising, in combination: a contoured gyroscopic rotor having upon its periphery a multiplicity of radial vanes inclined to the longitudinal axis of the rotor; a tubular housing encircling said rotor, concentric therewith, and radially spaced therefrom to define an annular orifice for exhaust of propellant gases, said housing constituting the rear end of a rocket; rotary bearing means retained within the rotor, which is adapted to revolve freely thereupon; gimbal support means concentrically within and supporting the bearing for gyroscopic rotation and universally pivotal movement of the rotor conjunctively with the bearing; shaft means supporting the gimbal means in a radially and axially fixed position; means supporting the shaft in said housing in an axially fixed and a concentric relation to said housing; a pair of radial pins; caging means comprised of a ball residing partially within an axial detent in the end of the shaft means and partially within an axial seat formed by the ends of said radial pins, said pins being slidably disposed within two respectively opposite bores within the aft portion of the rotor; spring means providing radially inward yielding pressure against said pins, tending to restrict the outward movement of the pins until the centrifugal force caused by rotation of the rotor about its longitudinal axis overcomes such urging, at which time the pins are adapted to move radially outward and the axial seat formed by their respective ends to dilate, allowing aft movement of the caging ball consequential to the acceleration of the rocket and, further, allowing the rotor to pivot about its gimbal axes at any time subsequent to said aft movement of the caging ball and at no time previous thereto; chamber means to receive the caging ball when said aft movement occurs; said housing attaching to the forward end of the shaft means in such a manner that the rotor is consequently positioned in a predetermined concentric and axial relationship within the aft area of the housing, said housing having a contoured internal wall cooperating with the periphery of said rotor to define an annular orifice within which the rotor rotates; a stationary thrust shield surrounding the forward periphery of the rotor and so contoured that said shield maintains constant peripheral clearance with the rotor and, further, which resides within the orifice so that a variable-geometry annular nozzle area is provided in said orifice; passage means through the forward end of the housing admitting effluent gases from the combustion of the fuel of said rocket and to direct said gases in an aft direction through the annular orifice so that a rotational velocity about a longitudinal axis is imparted to the rotor through the radial vanes thereupon.

5. A gyroscopic stabilizer for rockets and the like comprising, in combination: a contoured gyroscopic rotor having upon its periphery a multiplicity of radial turbine vanes, and having a spheroidal cavity within the aft portion thereof, concentric with the outer surfaces thereof; a tubular housing; shaft means provided at one end with means fastening the shaft to said housing and provided at the other end with an enlarged spheroidal portion disposed within the spheroidal cavity in the rotor and maintaining uniform pheripheral clearance at all times therewith; internal thread means within the rotor, forward of the spheroidal cavity and concentric therewith; a raceway plug threaded into and seated within said internal thread means and having an internal cylindrical bearing raceway cavity adapted to lie contiguously with the spheroidal cavity in the rotor; a plurality of bearing balls residing within the peripheral clearance between the cylindrical cavity in the raceway plug and the spheroidal end of the shaft, forming an effective spherical-type bearing means therewith; said fastening means supporting the shaft within a concentric housing; caging means restraining rotation of the rotor about a lateral axis until a predetermined rotational velocity of said rotor about a longitudinal axis is attained; said housing means supporting the shaft, containing the rotor therewithin, and forming an annular nozzle orifice with said rotor; passage means through the housing adapted to direct effluent rocket combustion gases through said annular nozzle orifice so that said gases rotate the rotor about its longitudinal axis; and mounting means for attaching the housing to a rocket, so that it forms an annular thrust nozzle therefor.

References Cited in the file of this patent

UNITED STATES PATENTS

| | | |
|---|---|---|
| 954,634 | Jones | Apr. 12, 1910 |
| 1,296,137 | Taylor | Mar. 4, 1919 |
| 1,316,363 | Hayden | Sept. 16, 1919 |
| 2,822,755 | Edwards et al. | Feb. 11, 1958 |
| 2,850,977 | Pollak | Sept. 9, 1958 |

FOREIGN PATENTS

| | | |
|---|---|---|
| 781,466 | Great Britain | Aug. 21, 1957 |